United States Patent [19]

Maison

[11] 3,841,226
[45] Oct. 15, 1974

[54] ON BOARD SWITCHING APPARATUS FOR TRACKLESS AIR CUSHION VEHICLE

[75] Inventor: Richard L. Maison, San Diego, Calif.

[73] Assignee: Rohr Industries, Inc., Chula Vista, Calif.

[22] Filed: Aug. 24, 1972

[21] Appl. No.: 283,364

[52] U.S. Cl............................. 104/130, 104/23 FS
[51] Int. Cl........................................... B61b 13/08
[58] Field of Search.......... 104/96, 105, 130, 23 PS, 104/148 MS, 148 LW, 134

[56] References Cited
UNITED STATES PATENTS

| | | | |
|---|---|---|---|
| 3,276,392 | 10/1966 | Cockerell | 104/23 FS |
| 3,340,822 | 9/1967 | Dela Salle | 104/130 |
| 3,643,600 | 2/1972 | Bertin | 104/130 X |
| 3,680,488 | 8/1972 | Donlon | 104/130 |
| 3,696,753 | 10/1972 | Ross | 104/23 FS |

*Primary Examiner*—M. Henson Wood, Jr.
*Assistant Examiner*—D. W. Keen
*Attorney, Agent, or Firm*—Patrick J. Schlesinger

[57] ABSTRACT

A switching arrangement for trackless air cushion vehicles wherein there is provided vehicle guideways which define channels having walls leading in different directions. Switch apparatus carried by the vehicle provides for a pair of opposed hollow bearing plates each having orifices in one face for the selective flow of air under pressure therefrom. The plates are each positionable with its orificed face in close proximity with one of the walls during travel of the vehicle. When air is allowed to flow from one bearing plate face and between it and one of the walls, the plates and the vehicle are all urged toward that one wall to thus guide the vehicle in one of the desired directions.

5 Claims, 10 Drawing Figures

PATENTED OCT 15 1974 3,841,226

PATENTED OCT 15 1974 3,841,226

ON BOARD SWITCHING APPARATUS FOR TRACKLESS AIR CUSHION VEHICLE

BACKGROUND OF THE INVENTION

Apparatus of the type revealed and described in U.S. Pat. application, Ser. No. 240,422, filed on 4/3/72 and entitled "Rotatable Bridge Switch for Trackless Air Cushion Vehicles," provides for the switching of trackless air bearing vehicles by means of a rotatable bridge switch positioned intermediate a main guideway portion and a pair of branch guideway portions, the switch being openable from a remote location outside the vehicle to effect the desired switching. Similarly, another switch arrangement revealed and described in U.S. Pat. application, Ser. No. 251,400, filed on 5/8/72 and entitled "Turntable for Trackless Air Bearing Vehicles," accomplishes switching inside the vehicles by means of a turntable arrangement also openable from a location remote to the vehicles. Neither of the devices of the above mentioned applications make provision for on board switching of vehicles that can be achieved solely from positions on the vehicles without reliance on remote facilities or control stations. Accordingly, it is desirable that an on board switch be provided trackless air bearing vehicles which can be operated from control stations on the vehicles, and which can be operated at will to effect switching of the vehicles, quickly and efficiently. Such a switching arrangement is provided by the apparatus of the present invention.

SUMMARY OF THE INVENTION

Apparatus having channel defining means with walls leading in different directions, and switch means adapted for positioning on a vehicle for cooperating with one of the walls to guide the vehicle in one of the directions.

DESCRIPTION OF THE PREFERRED EMBODIMENT

Figure 1:
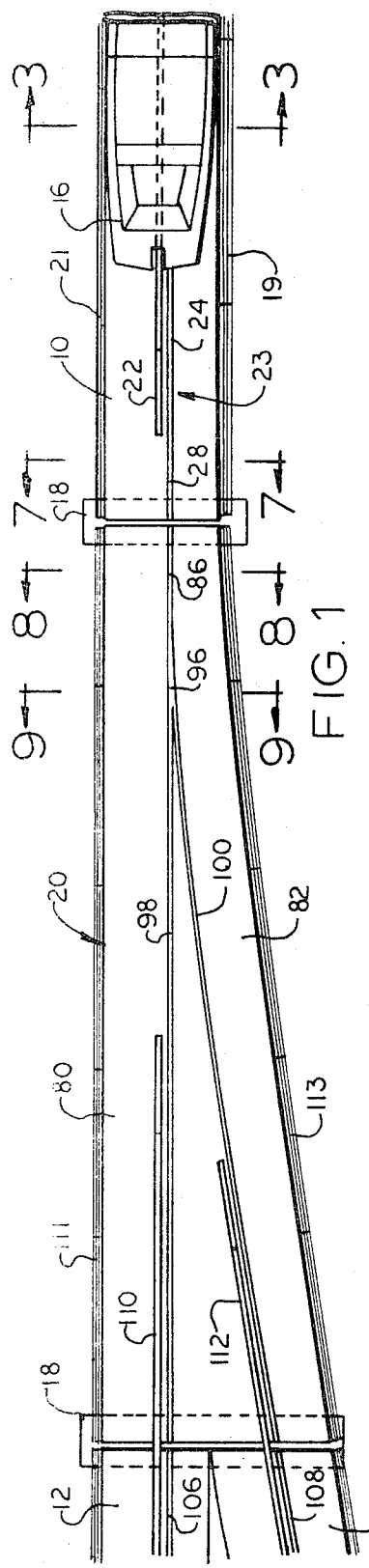
FIG. 1 shows a plan view of a guideway system for trackless air bearing vehicles incorporating the switching arrangement of the present invention.
Figure 2:
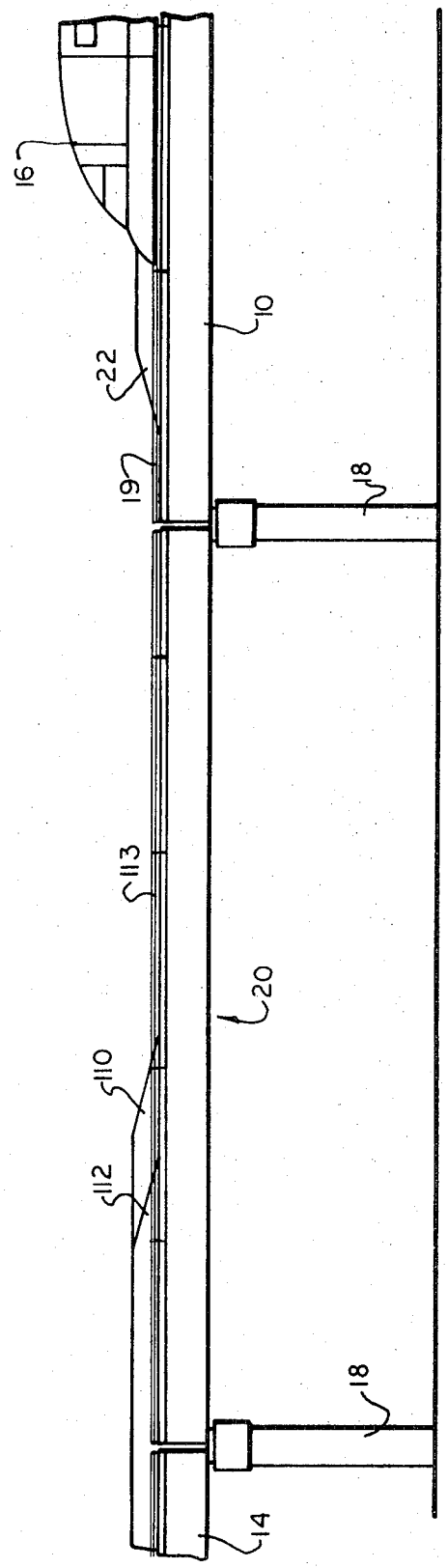
FIG. 2 is a die elevational view of the guideway system of FIG. 1.

Referring to FIGS. 1 and 2, there is shown apparatus of the present invention incorporating a main concrete guideway 10 and a pair of branch guideways 12 and 14 for a trackless air cushion vehicle 16, the guideways 10, 12 and 14 being supported on the gound as by concrete piers 18. A switch guideway, generally designated by the numeral 20, is provided intermediate the guideways 10, 12, and 14, which is also supported at its ends by the piers 18.

Figure 4:
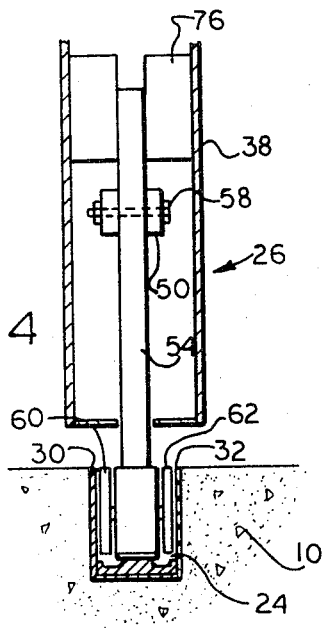
FIG. 4 is an enlarged portion of FIG. 3 showing details of the switch carried by the vehicle and the switch insertion section of the main guideway.
Figure 5:
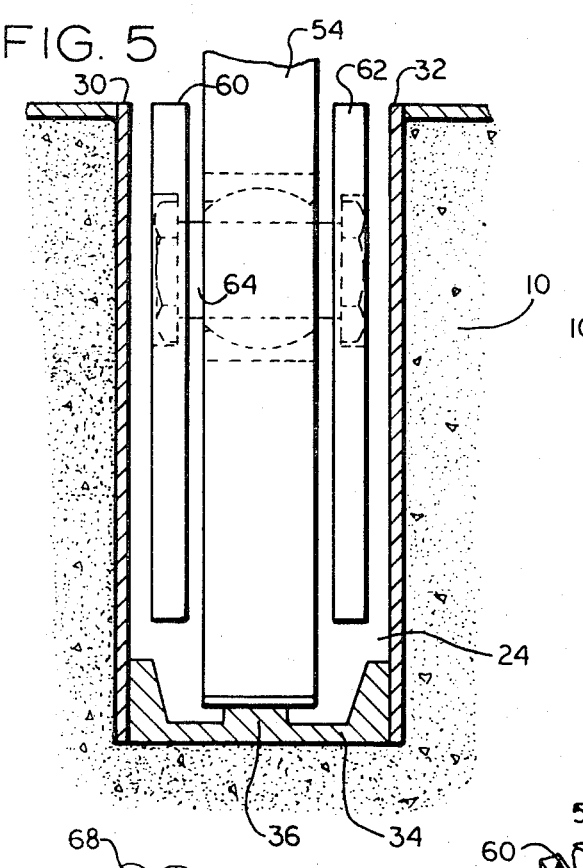
FIG. 5 is an enlarged portion of FIG. 4 showing even greater details of the switch and switch insertion section.
Figure 7:
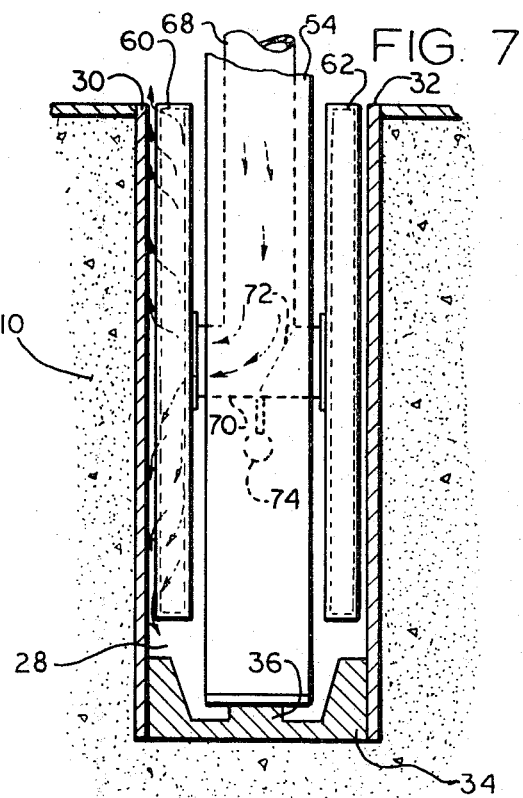
FIG. 7 is a cross sectional view taken along the lines 7 — 7 of FIG. 1 showing details of the wall discrimination section of the main guideway with the switch positioned therein.

The main guideway 10 has power rails 19 and 21 on its edges, reaction rail 22 along the middle of its top surface, and a generally rectangularly shaped channel 23 in the concrete along the reaction rail 22. The channel 23 consists of a switch insertion section 24, best shown in FIGS. 3, 4, and 5, which is relatively wide to receive a portion of switch mechanism 26 carried by the vehicle, as will hereinafter be more fully described, and a wall discrimination section 28, best illustrated in FIG. 7, into which the insertion section narrows. Both the insertion section 24 and the wall discrimination section 28 are provided with opposed metallic side walls 30 and 32 along their lengths, and a bottom switch support member 34 with a raised intermediate portion 36.

Figure 3:
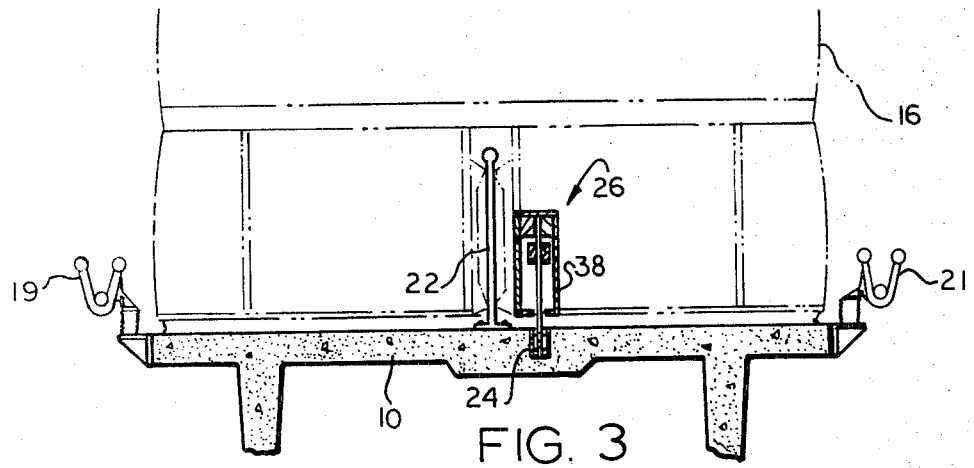
FIG. 3 is a cross sectional view taken along the lines 3 — 3 of FIG. 1.

Referring to FIG. 3, the switch mechanism 26 consists of a housing 38, mounted within the vehicle and carrying a switch generally designated by the numeral 40. Two switch mechanisms 26 are provided on each vehicle, one mechanism being located in the vehicle front and one in the rear portion of the vehicle. Only one switch mechanism 26 is illustrated and described in detail for purposes of this invention, since both mechanisms are similarly constructed.

Figure 6:
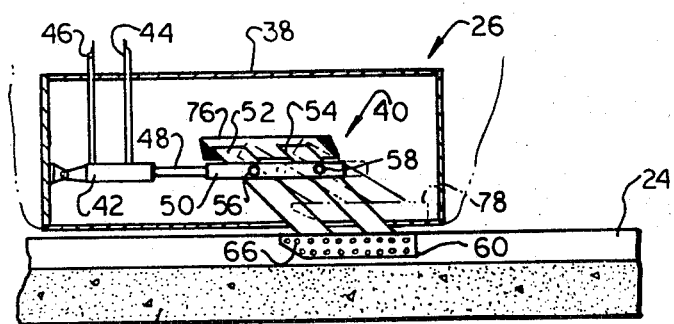
FIG. 6 is a cross sectional view taken along the lines 6 — 6 of FIG. 3 showing further detail of the switch.

Referring to FIGS. 4, 5, 6, and 7, wherein the details of the switch 40 are best illustrated, there is provided a hydraulic cylinder 42 suitably mounted to the housing 38 and adapted for actuation by means of hydraulic fluid lines 44 and 46 from the vehicle control position (not shown) to move the piston rod 48 to the right or left as desired. Attached to the rod 48 is a yoke shaped member 50 which is adapted to carry a pair of plate support members 52 and 54 pivoted at their upper portions to the yoke shaped member 50 at 56 and 58, and to a pair of hollow plates 60 and 62 as at 64 at their bottom portions. The bearing plates 60 and 62 are each provided with a plurality of orifices 66 in one face through which air under pressure is allowed to exit. The air is supplied from a source of fluid pressure (not shown) on the vehicle through a conduit 68 and pipe joint 70 which has the plates 60 and 62 pivotally arranged thereon. A valve 72 located within the joint 70 serves to direct the air to either the bearing plate 60 or the plate 62, as desired. The valve 72 can be fluid actuated as by means of fluid supplied through the line 74 from the control position (not shown) on the vehicle. A box-like member 76 within the housing 38 encompasses the upper ends of the members 52 and 54, and serves to provide the means whereby the members 52 and 54 are pivoted by engagement therewith when the rod 48 is moved to the left to position the plates 60 and 62 in the channel section 24 and to the dashed line position 78 when moved to the right, as shown in FIG. 6.

Figure 8:
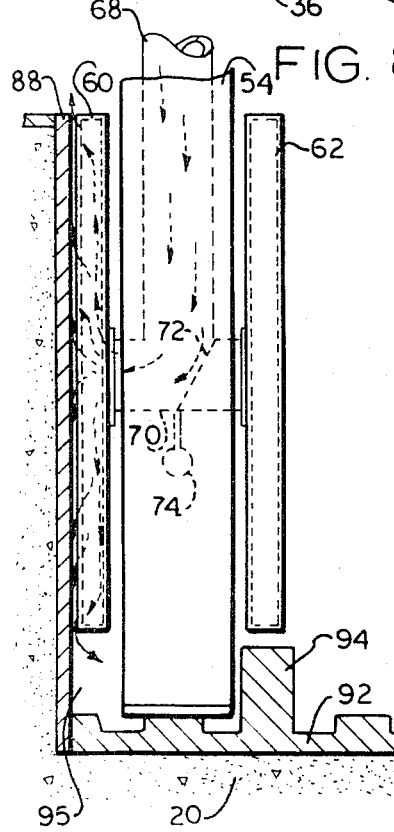
FIG. 8 is a cross sectional view taken along the lines 8 — 8 of FIG. 1 showing details of the mechanical switch locking section of the switch guideway with the switch also positioned therein.
Figure 9:
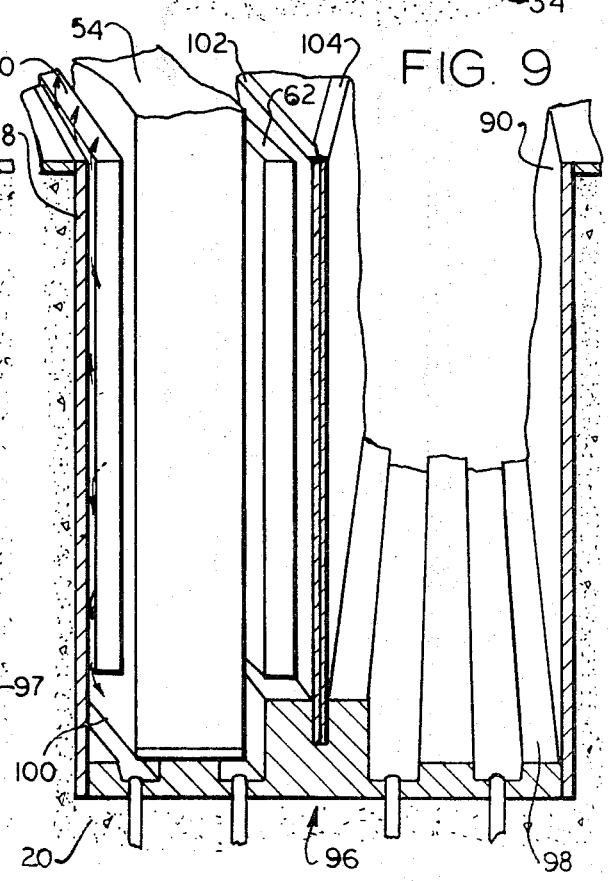
FIG. 9 is a cross sectional view taken along the lines 9 — 9 of FIG. 1 showing details of the switch junction section of the switch guideway with the switch also positioned therein for greater clarity.

The switch guideway 20 consists of a guideway section 80 leading into the branch guideway 12, and a section 82 leading into the branch guideway 14. Defined in the top surface of the switch guideway portion 20 is a channel 84 having a generally rectangularly shaped mechanical locking section 86, best shown in FIG. 8, into which the wall discrimination section 28 of the main guideway channel 28 of the main guideway channel widens. The locking section 86 has a wall portion 88 which is aligned with the wall 30 of the discrimination section 28, and a wall portion 90 aligned with the wall portion 32. Provided in the bottom of the locking section 86 is a switch support and locking member 92 with a raised intermediate portion 94 dividing the section into two portions 95 and 97. The locking section 86 in turn widens into a switch junction section 96, best shown in FIG. 9, which in turn opens into a pair of channels 98 and 100 defined in the switch guideway section 80 and 82, respectively. The wall portions 88 and 90 are also provided in the channels 98 and 100, respectively, as well as a wall 102 opposing the wall 88, and a wall 104 opposite the wall 90.

The branch guideway portion 12 is provided with a channel 106 that aligns with the channel 98 in the switch guideway section 80. The other branch guideway portion 14 is also provided with a channel 108 that aligns with the channel 100 of guideway section 82.

A reaction rail 110 and a power rail 111 span the branch guideway section 80 in alignment with the reaction rail 22 and power rail 21 of the main guideway portion 10. Another reaction rail 112 as well as a power rail 113 are also provided to span the branch guideway 14 and the switch guideway section 82.

Figure 10:
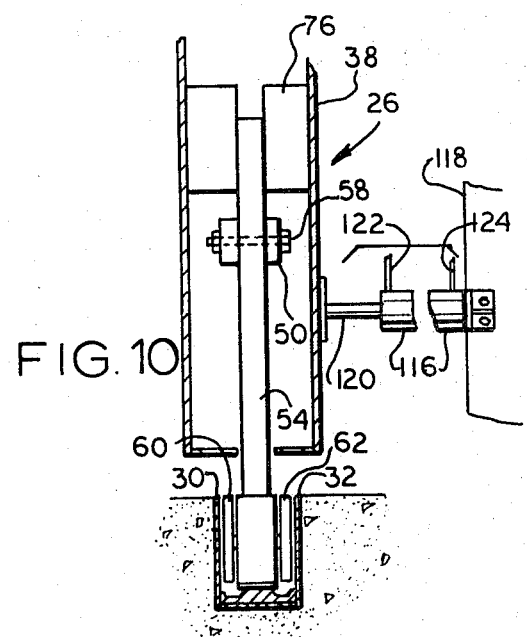
FIG. 10 is a cross sectional view similar to that of FIG. 9 showing additional apparatus capable of use with the switch of the present invention to accomplish switching.

FIG. 10 shows apparatus which can be utilized to accomplish switching of the vehicle 16 in a manner other than by the provision of fluid under pressure to either of the air bearings 60 and 62, as hereinbefore set forth. To this end there is provided a hydraulic cylinder 116 suitably attached to a portion 118 of the vehicle 16 and which has a piston rod 120 secured to the housing 35 of switch 26. A pair of hydraulic fluid lines 122 and 124 serve to conduct fluid under pressure from a source of pressure on the vehicle (not shown). It will be appreciated that when switching is desired, fluid can be directed to the cylinder 116 to move the piston rod 120 in a direction to urge either the bearing 60 toward the wall 30 or the bearing 62 toward the wall 32, depending on the direction of travel desired, as will hereinafter be more fully set forth.

Operation of the switching apparatus of the present invention can best be described with reference to FIGS. 1–9. As the vehicle 16 approaches a switch junction, it is first made captive with the guideway 10 by applying fluid under pressure to the cylinder 42 such that the bearing plates 60 and 62 are lowered into the switch insertion channel section 24. As hereinbefore set forth, it is desirable that there be employed a plurality of such switching arrangements as 26 on the vehicle 16, preferably at least two in number, one switching assembly being at the front of the vehicle and the other at the aft portion of the vehicle. Next as the insertion channel 24 narrows into the wall discrimination channel section 28 the bearing plates 60 and 62 become positioned in relatively close proximity to the walls 30 and 32 respectively. At this point in the travel of the vehicle let it be assumed that it is desired that the vehicle 16 be switched to the branch guideway 14, as illustrated. To this end fluid under pressure is supplied to the plate 60 through the conduit 68. The pneumatic flow of fluid through the orifices 66 between the plate 60 and the wall 30 tends to pull the plate toward that wall and holds it in close proximity thereto but not in touching relationship therewith. As the vehicle advances the discrimination section 28 widens into the locking section 86 wherein the locking member 92 with the raised portion 94 serves to lock the plate support members 52 and 54 in the locking section portion 86. The locking section 86 now widens into the switch section 96 as the vehicle proceeds and the support members 52 and 54 are guided into the channel 100 of the switch section, and then finally into channel 108 of the branch guideway portion 14, thus accomplishing the desired switching of the vehicle.

Alternative similar switching of the vehicle 16 can be achieved with the apparatus revealed in FIG. 10. To this end instead of applying fluid under pressure to the plate 60 to exert force on the plate tending to pull it toward the wall 30 during travel in the discrimination section 28, as hereinbefore set forth, fluid under pressure can be applied through the conduit 124 to the cylinder 116 to exert force through the piston rod 120 to urge the housing 38 and plate 60 in close proximity to the wall 30.

It will be apparent that several embodiments of on board switching apparatus for trackless air bearing vehicles have been described.

Obviously many modifications and variations of this invention are possible in view of the above teachings. It is therefore to be understood that within the scope of the appended claims the invention may be practiced otherwise than as specifically described.

I claim:

1. A switching system for trackless air bearing vehicles comprising;
  a main guideway section having a substantially flat top surface with a reaction rail extending upwardly from its top surface,
  a pair of branch guideway sections each having a substantially flat top surface with a reaction rail extending upwardly from its top surface,
  said main guideway section being longitudinally spaced from said pair of branch guideways,
  a switch guideway section having a substantially flat top surface positioned with one of its ends adjacent one end of said main guideway and with its opposite end adjacent one of the ends of each of said pair of branch guideways,
  channel means formed in the top surface of said main guideway section, said pair of branch guideway sections, and said switch guideway sections, said channel means being laterally offset from said reaction rails,
  said channel means having a switch insertion section, a wall discrimination section, a locking section, and a switch junction section with them aligned in the same order that they are enumerated,
  a trackless air bearing vehicle having means on its under surface for guidingly receiving an upwardly extending reaction rail and also a retractable switch mechanism mounted on the under surface of said vehicle with said switch mechanism being laterally offset from said means for guidingly receiving an upwardly extending reaction rail, and said retractable switch mechanism comprising air bearing means which when lowered ride in said channel means to guide said vehicle through the switching system, said air bearing means being positioned in close proximity to the vertical walls of said channel means whereby when air is supplied under pressure to the orifices adjacent one of said vertical walls, the air bearing means is drawn toward that wall of said channel means causing said air bearing vehicle to be switched to a predetermined branch guideway.

2. A switching system as recited in claim 1 wherein said switch insertion section narrows into said wall discrimination section.

3. A switching system as recited in claim 2 wherein said switch insertion section, said wall discrimination section, said locking section, and said switch section are provided with opposed metallic side walls.

4. A switching system as recited in claim 1 wherein said wall discrimination section widens into said locking section and said locking section has a raised intermediate portion dividing the section into two portions which restricts the lateral travel of said air bearing means.

5. A switching system as recited in claim 1 wherein said locking section widens into said switch junction section.

* * * * *